(12) United States Patent
Huynh

(10) Patent No.: US 8,099,061 B2
(45) Date of Patent: Jan. 17, 2012

(54) TDD RECEIVER PROTECTION

(75) Inventor: Viet Huynh, Murphy, TX (US)

(73) Assignee: Cisco Technology, Inc., San Jose, CA (US)

( * ) Notice: Subject to any disclaimer, the term of this patent is extended or adjusted under 35 U.S.C. 154(b) by 937 days.

(21) Appl. No.: 11/701,617

(22) Filed: Feb. 2, 2007

(65) Prior Publication Data

US 2007/0218852 A1    Sep. 20, 2007

Related U.S. Application Data

(60) Provisional application No. 60/782,745, filed on Mar. 15, 2006.

(51) Int. Cl.
*H04B 1/44* (2006.01)
*H04J 3/00* (2006.01)
*H04L 5/14* (2006.01)

(52) U.S. Cl. ............................ 455/78; 370/280; 370/294

(58) Field of Classification Search .................... 455/78, 455/82–84, 550.1; 370/276, 280, 294, 321
See application file for complete search history.

(56) References Cited

U.S. PATENT DOCUMENTS

| | | | | |
|---|---|---|---|---|
| 4,412,337 | A | 10/1983 | Bickley et al. | 375/60 |
| 5,901,172 | A | 5/1999 | Fontana et al. | 375/200 |
| 6,631,255 | B1 * | 10/2003 | Claxton et al. | 455/203 |
| 6,859,831 | B1 | 2/2005 | Gelvin et al. | 709/224 |
| 7,079,815 | B2 * | 7/2006 | Pozgay et al. | 455/78 |
| 7,206,566 | B1 * | 4/2007 | Lynch | 455/313 |
| 7,373,115 | B2 * | 5/2008 | Monroe | 455/82 |
| 2004/0203550 | A1 | 10/2004 | Xu | 455/277.1 |

FOREIGN PATENT DOCUMENTS

WO    WO 02/060204 A2    8/2002

* cited by examiner

*Primary Examiner* — Eugene Yun

(57) ABSTRACT

Techniques are provided herein for a receiver protection circuit in a time-division duplex (TDD) system. The receive protection circuit has a first diode with an anode that is coupled to an input of a low-noise-amplifier (LNA) and a cathode that is coupled to a ground. A controller is coupled to the anode of the diode and is configured to generate a control signal for turning on the diode when the TDD system is in a transmission mode. A load is coupled to the diode such that a reflected transmit signal is shorted to the ground by the diode and the radio frequency energy carried in the reflected transmit signal is consumed by the load.

22 Claims, 1 Drawing Sheet

TDD RECEIVER PROTECTION

CROSS REFERENCE

The present application claims the benefit of U.S. Provisional Application Ser. 60/782,745, which was filed on Mar. 15, 2006.

BACKGROUND

The present disclosure relates generally to time division duplex (TDD) communication systems, and more particularly to receiver protection in the TDD transceivers.

TDD is a process of allowing two way communications between two devices by time sharing. When using TDD, one device (device A) transmits, then the other device (device B) listens for a short period of time. After the transmission is complete, the devices reverse their roles, i.e., device A becomes a receiver and device B becomes a transmitter. The process continually repeats itself, so that data appears to flow in both directions simultaneously.

A circulator is usually used to switch connections of either the transmitter or receiver to a common antenna. A circulator passes a transmit signal to the antenna with low attenuation, but will not pass the transmit signal to the receiver. A limitation to using a circulator in a TDD system is that any transmit power reflected by the antenna, i.e., not absorbed by the antenna, may be conducted back to the receiver. This may damage the receiver. The receiver, in turn, must therefore increase power handling capability.

Therefore, what is desired is a protection circuit for the TDD receiver.

SUMMARY

In view of the foregoing, techniques are described herein for a receiver protection circuit in a time-division duplex (TDD) system which comprises a first diode with an anode coupled to an input of a low-noise-amplifier (LNA) and a cathode coupled to a ground (GND), a controller coupled to the anode of the diode and configured to generate a first control signal for turning on the diode when the TDD system is in a transmission mode, and a load coupled to the diode, wherein a reflected transmit signal is shorted to the GND by the diode and the radio frequency (RF) energy carried in the reflected transmit signal is consumed by the load.

The construction and method of operation of the techniques described herein, together with additional objects and advantages thereof will be best understood from the following description of specific embodiments when read in connection with the accompanying drawings.

BRIEF DESCRIPTION OF THE DRAWINGS

The techniques described herein are illustrated by way of example, and not by way of limitation, in the figures of the accompanying drawings in which like reference numerals refer to similar elements.

DESCRIPTION

Figure 1:
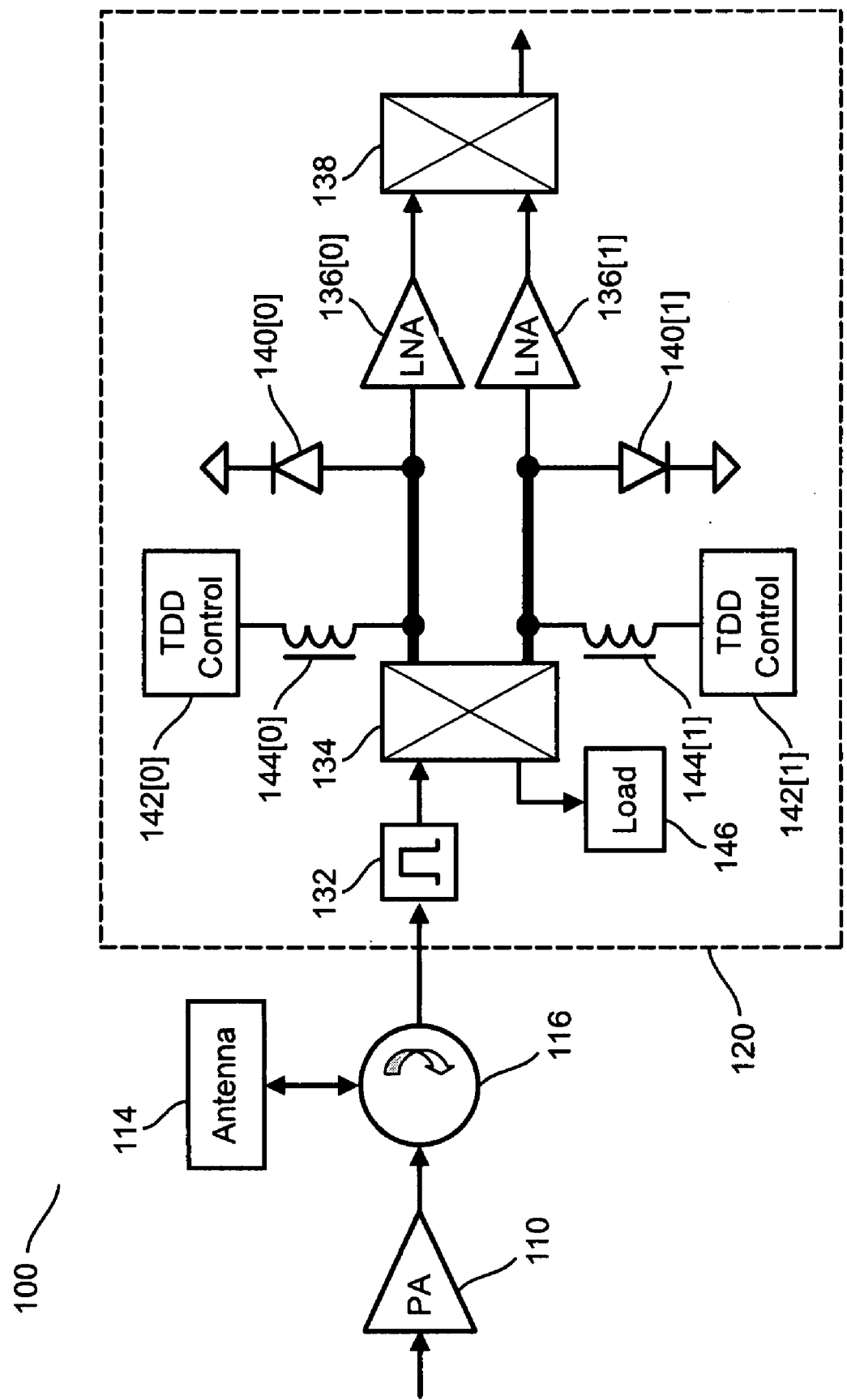
FIG. 1 is a block diagram illustrating a TDD receiver with protection circuits according to one embodiment.

The following will provide a detailed description of a protection circuit for a time division duplex (TDD) receiver.

FIG. 1 is a block diagram illustrating a TDD receiver 120 having protection circuits according to one embodiment. The TDD receiver 120 is part of a TDD transceiver 100, which also includes a TDD transmitter (not shown entirely). Shown in FIG. 1 is a power amplifier (PA) 110 belonging to the TDD transmitter, which amplifies transmit signals to an antenna 114 through a circulator 116 when the transmitter is turned on. Radio frequency (RF) energy goes through the circulator 116 to the antenna 114. Some of the RF energy will reflect back from the antenna 114 to the circulator 116, and then into the receiver 120.

The receiver 120 comprises a high-pass filter 132, a first hybrid coupler 134, a balanced pair of low-noise-amplifier (LNA) 136[0:1] and a second hybrid coupler 138. A received signal or a reflected transmit signal passes through the circulator 116, the high-pass filter 132 to the hybrid coupler 134, from where the signal is split into two balanced signals, one is fed into the LNA 136[0] and the other into the LNA 136[1]. The hybrid coupler 134 may be implemented as having 3 dB attenuation and a 90° phase shift.

The reflected transmit signal normally carries large amount of energy due to its proximity to the PA 110. The LNA either 136[0] or 136[1] may be burned if the signal level of the balanced signal is too high. The receiver can be afforded protection by adding p-type, intrinsic, n-type (PIN) diodes 140[0:1] between the inputs of LNAs 136[0:1] and a ground (GND). PIN diode 140[0] for the LNA 136[0], and PIN diode 140[1] for the LNA 136[1]. An anode of the PIN diode 140[0] is coupled to an input of the LNA 136[0]. A cathode of the PIN diode 140[0] is coupled to the GND. Similarly, an anode of the PIN diode 140[1] is coupled to an input of the LNA 136[1]. A cathode of the PIN diode 140[1] is coupled to the GND.

Two TDD control units 142[0:1] along with two RF chokes 144[0:1] are also added. When the transmitter is turned on, the TDD control 142[0] generates a logic HIGH signal, which turns on the PIN diode 140[0], therefore, a ¼ wavelength of the reflected signal feeding toward the LNA 136[0] will be shorted to the GND. At the same time, the TDD control 142[1] also generates a logic HIGH signal, which turns on the PIN diode 140[1], which shorts a ¼ wavelength of the reflected signal feeding toward the LNA 136[1] to the GND. Most RF energy is carried in the ¼ wavelength. Here the RF chokes 144[0:1] filter out RF signals going into the TDD control 142[0:1], respectively.

Although the two TDD controllers 142[0:1] are used according to the embodiment, one having skills in the art would realize that a single TDD control can turn on both the PIN diodes 140[0:1] at the same time by coupling an output of the single TDD control to both PIN diodes 140[0:1]. It is also understood by one having skills in the art that not only PIN diodes can serve the purpose of shorting the reflected signals to the GND, other diodes, such as metal-on-semiconductor (MOS) diodes can be used as well.

Referring to FIG. 1, a resistive load 146 is coupled to the hybrid coupler 134. After the reflected RF signals being shorted to the GND, RF energy in the reflected RF signals will be reflected back through the hybrid coupler 134 and consumed by the resistive load 146. With the RF energy from the reflected transit signal consumed by the resistive load 146, the LNA 136[0:1] of the TDD receiver may be effectively protected.

Although the resistive load 146 is a convenient and inexpensive solution to consume the reflected RF energy, one having skills in the art would be able to construct other kind of load, such as capacitive, to consume the reflected energy.

The above illustration is by way of example only.

What is claimed is:

1. An apparatus comprising:
    a time-division duplex (TDD) transceiver comprising a transmitter and a receiver, wherein the receiver further comprises a first low-noise-amplifier (LNA);
    a first hybrid coupler comprising an input port configured to receive radio frequency (RF) signals, a first output port coupled to an input of the first LNA, a second output port, and an isolation port;
    a first diode with an anode coupled to the input of the first LNA and a cathode coupled to a ground (GND);
    a first controller coupled to the anode of the first diode and configured to generate a first control signal for turning on the first diode when the TDD transceiver is in a transmission mode; and
    a load coupled to the isolation port configured to consume any energy from RF signals reflected to the first and second output ports.

2. The apparatus of claim 1, wherein the first diode is a p-type, intrinsic, n-type (PIN) diode.

3. The apparatus of claim 1, wherein the load is a resistive load.

4. The apparatus of claim 1, further comprising a RF choke coupled on a conduction path that carries the first control signal.

5. The apparatus of claim 1, wherein the first hybrid coupler has a 3 dB attenuation and 90 degree phase shift.

6. The apparatus of claim 1, wherein the receiver further comprises a second LNA coupled to the second output port of the first hybrid coupler, and further comprising a second diode coupled to an input of the second LNA, wherein the second diode is turned on during the transmission mode by a second control signal.

7. The apparatus of claim 6, wherein the second control signal is generated either by a second controller or the first controller.

8. The apparatus of claim 6, further comprising a second hybrid coupler configured to be coupled to outputs of the first and second LNAs.

9. A system comprising:
    a time-division duplex (TDD) transmitter;
    a TDD receiver with a first low-noise-amplifier (LNA);
    a circulator coupled between the TDD transmitter and TDD receiver;
    a receiver protection circuit comprising:
        a first diode with an anode coupled to an input of a first low-noise-amplifier (LNA) and a cathode coupled to a ground (GND);
        a first controller coupled to the anode of the first diode configured to generate a first control signal for turning on the first diode when the system is in a transmission mode;
        a first hybrid coupler coupled between the circulator and the first LNA; and
        a load coupled to the first diode through the first hybrid coupler.

10. The system of claim 9, wherein the first diode is a p-type, intrinsic, n-type (PIN) diode.

11. The system of claim 9, wherein the load is a resistive load.

12. The system of claim 9, wherein the first hybrid coupler has a 3 dB attenuation and 90 degree phase shift.

13. The system of claim 9, wherein the receiver protection circuit further comprises a radio frequency choke coupled on a conduction path that carries the first control signal.

14. The system of claim 9, wherein the receiver further comprises a second LNA coupled to the first hybrid coupler that is in balance with the first LNA, and the receiver protection circuit further comprises a second diode coupled to an input of the second LNA, wherein the second diode is also turned on during the transmission mode by a second control signal.

15. The system of claim 14, wherein the second control signal is generated either by a second controller or the first controller.

16. The system of claim 14, further comprising a second hybrid coupler configured to be coupled to outputs of the first and second LNAs.

17. An apparatus comprising:
    a first hybrid coupler comprising an input port configured to receive radio frequency (RF) signals;
    a first low-noise-amplifier (LNA) and a second LNA balanced to each other, and both are coupled to the first hybrid coupler;
    a first diode with an anode coupled to an input of the first LNA and a cathode coupled to a ground (GND);
    a second diode with an anode coupled to an input of the second LNA and a cathode coupled to the GND;
    at least one controller coupled to the anodes of both the first and second diodes and configured to generate a control signal for turning on both the first and second diodes; and
    a load coupled to the first hybrid coupler configured to consume any energy reflected from RF signals received through the first hybrid coupler.

18. The apparatus of claim 17, wherein both the first and second diodes are p-type, intrinsic, n-type (PIN) diodes.

19. The apparatus of claim 17, wherein the load is a resistive load.

20. The apparatus of claim 17, further comprising a RF choke coupled on a conduction path that carries the first control signal.

21. The apparatus of claim 17, wherein the first hybrid coupler has a 3 dB attenuation and 90 degree phase shift.

22. The apparatus of claim 17, further comprising a second hybrid coupler configured to be coupled to outputs of the first and second LNAs.

* * * * *